United States Patent

[11] 3,581,626

[72] Inventor Daniel S. Matthews
513 Ford Road, Sacramento, Calif. 95838
[21] Appl. No. 821,695
[22] Filed May 5, 1969
[45] Patented June 1, 1971

[54] ADJUSTABLE ADMISSION VALVE MEANS FOR STEAM ENGINES AND THE LIKE
9 Claims, 7 Drawing Figs.

[52] U.S. Cl. .................................................. 91/180, 91/187
[51] Int. Cl. ....................................................... F01l 33/02, F01l 31/20
[50] Field of Search ........................................... 91/180, 187, 188

[56] References Cited
UNITED STATES PATENTS

| | | | |
|---|---|---|---|
| 1,079,643 | 11/1913 | Forrington | 91/180 |
| 1,115,470 | 10/1914 | Lipman | 91/180 |
| 1,293,726 | 2/1919 | Dickerson | 91/180 |
| 1,506,405 | 8/1924 | Burkel | 91/180 |

*Primary Examiner*—Paul E. Maslousky
*Attorney*—Alexander B. Blair

ABSTRACT: A plural piston steam engine has team admission ports leading to the cylinders and a rotary admission valve element has transfer ports for placing said admission ports in communication with the steam chest cyclically. The several transfer ports are spaced circumferentially on the admission valve element in a predetermined relation. A planetary transmission gear unit coupled to the rotary admission valve element establishes a predetermined constant reduction of speed between the engine crankshaft and rotary valve element and allows angular adjustment of the valve element to provide engine reversal and a dead center no-work position.

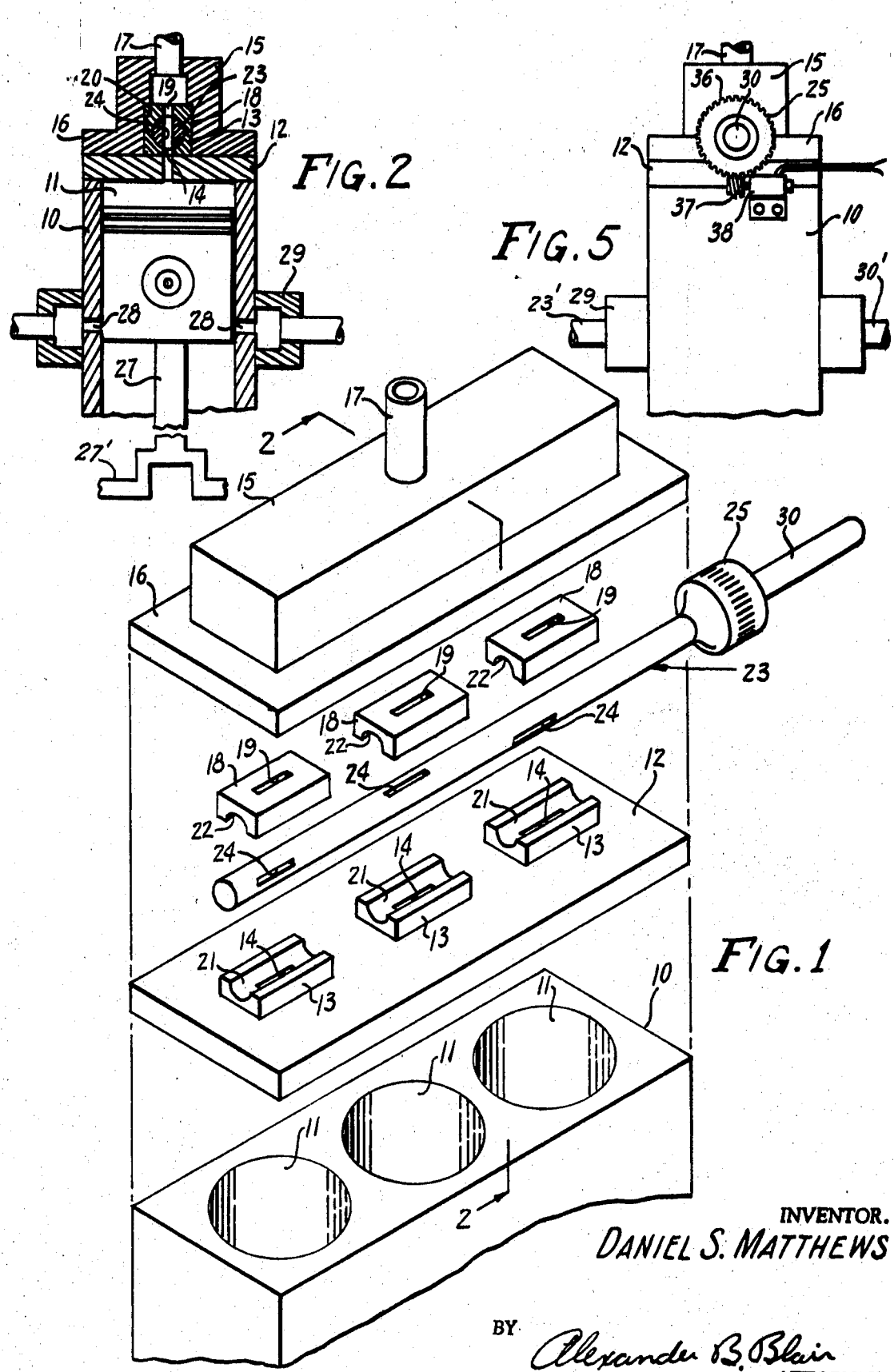

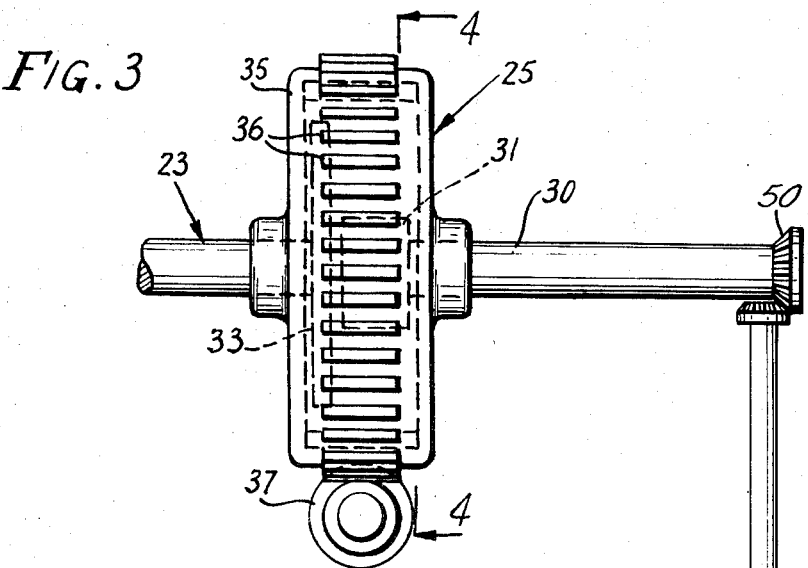
FIG. 3
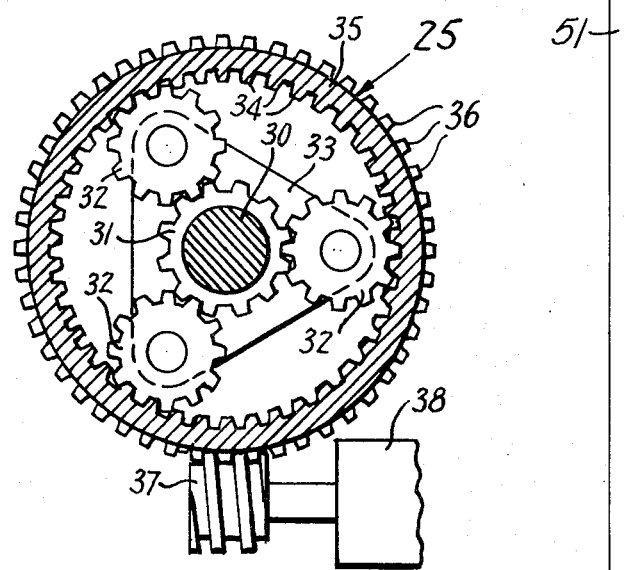
FIG. 4
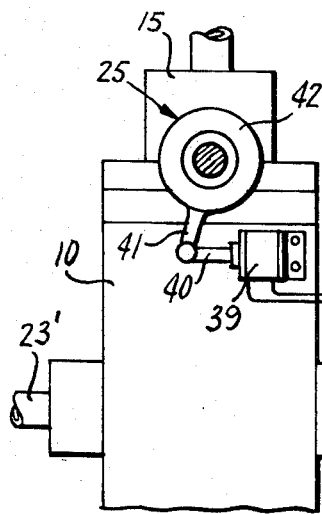
FIG. 6
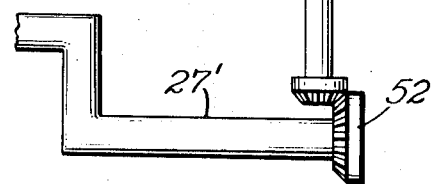
INVENTOR.
DANIEL S. MATTHEWS

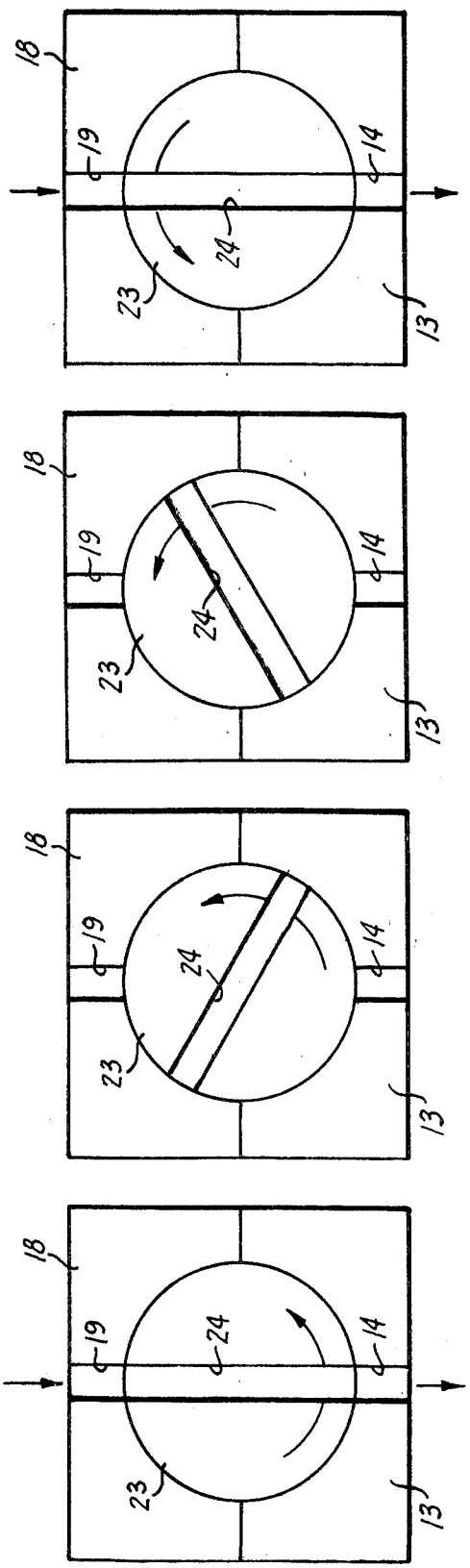

ADJUSTABLE ADMISSION VALVE MEANS FOR STEAM ENGINES AND THE LIKE

BACKGROUND OF THE INVENTION

With steam power experiencing a resurgence, particularly in vehicular engines and with the great advances in engine design, efficiency and simplification, there is a need for simplified and reliable control means to keep abreast of developments in metallurgy and other fields of technology which bear on ultimate engine efficiency of operation and reliability. More particularly, there is a great need for a simple and reliable steam admission valve means which is easily operable between straight ahead and engine reversal conditions as well as a neutral dead center condition. The admission valve means in order to meet the needs of the art must be simple and compact and easy to operate and free of bulky levers, links and slow-acting jackscrews commonly used with sliding type valve structures.

The present invention completely satisfies these needs through the provision of a small and compact planetary gear transmission unit coupled with the rotary admission valve shaft and with a primary drive shaft driven from the engine crankshaft through a suitable gearing arrangement. By this means, a specified speed reduction, such as 2:1, is established between engine crankshaft and admission valve shaft so that the latter will turn only one-half revolution for each complete revolution of the engine. The circumferential spacing of ports in the rotary admission valve shaft is established and fixed to satisfy the timing of a given number of engine cylinders. For example, for a three-cylinder engine, the valve shaft ports are spaced apart exactly 120° circumferentially. By rotary adjustment of the casing of the planetary gear unit, the admission shaft ports may be backed off circumferentially (30° for a three-cylinder engine) to produce engine reversal. If backed off only 15° by adjusting the planetary gear housing, the engine will obtain a dead center no-motion condition. Adjustment or rotation of the planetary unit may be achieved in a variety of ways, such as through a small motor and driven worm gear or a solenoid operated ratcheting device or the like.

The only timing requirement under the invention is that the engine crankshaft turns exactly twice the speed of the rotary admission valve shaft for the illustrated embodiment of the invention. The planetary transmission unit is self-locking after proper circumferential adjustment. The invention herein is applicable to a wide variety of engine types and is not restricted in its use to the particular engine embodiment illustrated.

Additional features and advantages of the invention will appear during the course of the following description.

BRIEF DESCRIPTION OF DRAWING FIGURES

FIG. 1 is a partly diagrammatic exploded perspective view of a steam engine equipped with the adjustable reversing rotary admission valve means of the invention.

FIG. 2 is a fragmentary vertical section taken on line 2-2 of FIG. 1.

FIG. 3 is a side elevational view of a planetary gear transmission unit.

FIG. 4 is a transverse vertical section taken on line 4-4 of FIG. 3.

FIG. 5 is an end elevational view of the engine showing a power means to rotate and adjust the planetary gear unit.

FIG. 6 is a similar view showing a modified means to adjust the planetary gear unit.

FIG. 7 is an enlarged diagrammatic view depicting the movement of one rotary admission valve port through 180° of rotation for each complete rotation of the engine crank shaft.

DETAILED DESCRIPTION OF PREFERRED EMBODIMENT -

Referring to the drawings in detail wherein like numerals designate like parts, the numeral 10 designates a steam engine cylinder block having three cylinder chambers 11, it being understood that the invention is not restricted to any particular engine configuration. The cylinder block is covered by a cylinder head 12 having pillow blocks 13 fixedly mounted thereon and corresponding in number and spacing to the cylinder chambers 11. Each pillow block 13 has a steam admission port or slot 14 in its bottom opening through the head 12 to thereby admit steam to the cylinder chambers. The admission ports 14 are in axial alignment or have the same circumferential position relative to the several cylinder chambers.

Atop the head 12 is a conventional steam chest 15 having a mounting flange 16 and a steam admission pipe 17 leading from a suitable steam generator. Bearing caps 18 having admission ports or slots 19 are mounted within a cavity 20 of the steam chest, and the caps 18 are in opposed abutting relationship to the pillow blocks 13 with the slots 19 and 14 in alignment as shown clearly in FIG. 2. The semicylindrical bearing faces 21 and 22 of the elements 13 and 18 form a complete cylindrical bearing support for a rotary steam admission valve shaft 23, now to be described.

The rotary admission valve shaft 23 extends through the several abutting pillow block and bearing cap elements 13 and 18 and is journaled for easy rotation therein. The shaft or element 23 has formed completely therethrough plural steam admission slots 24 corresponding in number and axial spacing to the aligned ports 14 and 19 but spaced apart circumferentially in a predetermined fixed configuration. As shown, for a three-cylinder engine, the admission slots 24 of rotary valve shaft 23 are spaced apart 120° circumferentially one from the other progressively along the axis of the shaft. Since each slot 24 passes completely through the shaft 23 and opens through diametrically opposite sides of the shaft, steam flow to the associated engine cylinder takes place upon every 60° of rotation, the shaft 23 turning at one-half engine crankshaft speed because of the planetary gear unit 25, now to be described. Each cylinder chamber 11 contains a working piston 26 having a connecting rod 27 leading to the engine crankshaft 27'. Exhaust steam from each cylinder chamber clears through ports 28 near the inner end of the piston stroke, said ports opening into conventional exhaust manifold means 29 which includes piping 23'—30'. Residue steam is trapped in the cylinder chamber to maintain high compression and heat on the piston head.

The planetary gear or transmission unit 25, FIGS. 3 and 4, comprises an input shaft 30 driven from the engine crankshaft through a suitable gearing arrangement 50, 51, and 52. This input shaft 30 has a pinion gear 31 fixed thereon and turning therewith and in mesh with three planet gears 32 on a carrier frame 33 to which the admission valve shaft 23 is rigidly secured. The planet gears 32 are in mesh with the teeth of an internal ring gear 34 on the annular casing 35 of the planetary gear unit, such casing having external gear teeth 36 capable of meshing with a worm gear 37, driven by a miniature electric motor 38 or some like means, as indicated in FIG. 5. FIG. 6 shows modified means for adjusting or rotating the casing 35 of the planetary gear unit 25. Such means may comprise a solenoid 39 whose plunger 40 is connected to the arm 41 of a suitable ratcheting device 42 capable of turning the gear casing 35 step-by-step in lieu of the motion imparted thereto by the previously described worm gear and motor.

FIG. 7 shows diagrammatically how steam is admitted to one particular engine cylinder by one admission slot 24 twice during each one-half revolution of the admission valve shaft 23 or twice during each complete engine crankshaft revolution, the gear transmission 25 causing the shaft 23 to turn exactly one-half of crankshaft rotational speed. FIG. 7 shows four separate positions of the shaft 23 and one slot 24 during a one-half revolution. The slot positions are 60° apart circumferentially from left to right in FIG. 7, and the left-hand and right-hand positions of the slot 24 shows steam being admitted to one cylinder while steam is blocked from the cylinder in all intermediate positions of the shaft 23 and slot 24. For a three-cylinder single acting engine with the slots 24 of admission valve shaft 23 spaced 120° apart circumferentially, the other two engine cylinders will receive steam in proper sequence. Steam will be admitted to one of the three engine cylinders on every 60° increment of rotation of the shaft 23 operating at one-half crankshaft speed. This mode of operation will produce normal forward operation of the engine.

When it is desired to reverse the engine, which is one of the main invention features, this can be readily done by activating the motor 38 and through the gears 37 and 36 turning the casing 35 of the planetary transmission unit and thus backing off the admission valve shaft 23 and its ports 24, 30° from the normal adjusted position for forward drive shown in FIG. 7. Backing off the shaft 23 only 15° will result in a dead center condition for the engine with no motion, and thus by simple rotational adjustment of the casing of the planetary gear unit, three engine conditions are obtainable, normal forward, complete reverse or neutral dead center. The specific means employed to adjust the planetary gear housing may be widely varied under the invention. As explained, the planetary gearing also functions at all times to impart rotation to the admission valve shaft 23 at exactly one-half engine speed.

It is believed that the operation of the admission valve means and its simplicity and flexibility because of the unique employment of the planetary transmission are now clear and require no additional description.

I claim:
1. In an engine, plural engine cylinders having pistons connected with crankshaft means, motive fluid supply means for said cylinders including a cylinder head and bearing elements having motive fluid admission ports leading to said cylinders, a rotary admission valve shaft journaled within the bearing elements and having cooperating motive fluid admission ports individual to the cylinders and bearing elements, said ports of the valve shaft extending entirely through the valve shaft diametrically and being spaced circumferentially on the valve shaft equidistantly in increments of a complete revolution corresponding to the number of said cylinders, and a gear transmission unit having an output rotary member connected directly to the valve shaft, an input rotary member operated by the engine crankshaft means, and intermediate gearing causing said valve shaft to rotate at a predetermined fraction of the speed of rotation of the engine crankshaft, said transmission unit comprising a planetary gear unit having a gear casing which is turnable relative to said valve shaft and said input rotary member, whereby the circumferential disposition of the valve shaft ports may be adjusted by turning the gear casing, and power means to effect rotation of the gear casing.

2. The structure of claim 1, and said power means comprising a gear on the exterior of said casing, a drive gear in mesh with said exterior gear, and a motor to turn the drive gear.

3. A rotary admission valve apparatus for a steam engine having multiple in line cylinders and steam chest means for supplying steam to said cylinders in proper sequence, the steam chest means including bearing elements having transfer ports through which steam may pass from the steam chest to the engine cylinders, said admission valve apparatus comprising a rotary shaft journaled upon the bearing elements and having axially spaced transverse through ports whose opposite ends are adapted to register sequentially with said transfer ports to admit steam to the engine cylinders in proper sequence, said transverse through ports being circumferentially spaced one from another in equal parts of a revolution and said equal parts corresponding in number to the number of engine cylinders, a planetary gear transmission unit having an output rotary member directly connected to said rotary shaft and having an input rotary member driven by the steam engine at twice the speed of the output rotary member and rotary shaft, said gear transmission unit having a circumferentially adjustable body whose turning produces circumferentially adjustable body whose turning produces circumferential adjustment of the transverse through ports in unison relative to said transfer ports, and power means coupled with said body to turn the same a desired increment and also serving to lock the body in a selected adjusted position.

4. The structure of claim 3, and said power means comprises an auxiliary motor and gearing driven by the motor and connected with the body of said gear transmission unit.

5. The structure of claim 3, and said power means comprising a solenoid having a reciprocatory plunger, and a ratcheting means connected with and operated by the plunger and connected with said body of said gear transmission unit to turn the same step-by-step.

6. The structure of claim 3, and said steam engine being a three-cylinder engine, said transverse through ports of said rotary shaft being three in number and being circumferentially spaced apart 120° on said rotary shaft, whereby each through port of the rotary shaft will communicate with the transfer ports for a particular engine cylinder twice during each one-half revolution of the admission valve apparatus rotary shaft.

7. The structure of claim 3, and wherein each through port is an axially elongated relatively narrow slot formed entirely through said rotary shaft at a point adjacent one engine cylinder.

8. The structure of claim 3, and plural equidistantly spaced planet gears on said output rotary member, an internal ring gear on said adjustable body in mesh with said planet gears, a central drive pinion in mesh with the planet gears and secured to the input rotary member.

9. In an engine, plural engine cylinders having pistons connected with crankshaft means, motive fluid supply means for said cylinders including a cylinder head and bearing elements having motive fluid admission ports leading to said cylinders, a rotary admission valve shaft journaled within the bearing elements and having cooperating motive fluid admission ports individual to the cylinders and bearing elements, said ports of the valve shaft extending entirely through the valve shaft diametrically and being spaced circumferentially on the valve shaft equidistantly in increments of a complete revolution corresponding to the number of said cylinders, and a gear transmission unit having an output rotary member connected directly to the valve shaft, an input rotary member operated by the engine crank shaft means, and immediate gearing causing said valve shaft to rotate at a predetermined fraction of the speed of rotation of the engine crankshaft, said motive fluid supply means comprising pillow blocks on said cylinder head in spaced relation, each pillow block having an admission port extending entirely through the cylinder head, a motive fluid chest mounted on the cylinder head and having motive fluid inlet means, bearing caps within said chest and opposing said pillow blocks and having admission ports in alignment with the admission ports of the pillow blocks and in communication with the interior of said chest, said pillow blocks and caps providing spaced axially aligned cylindrical bores receiving and supporting rotatably said admission valve shaft.